Aug. 7, 1928.
E. W. ENGLE
1,680,210
RECTIFIER ELECTROLYTE
Filed Jan. 7, 1927
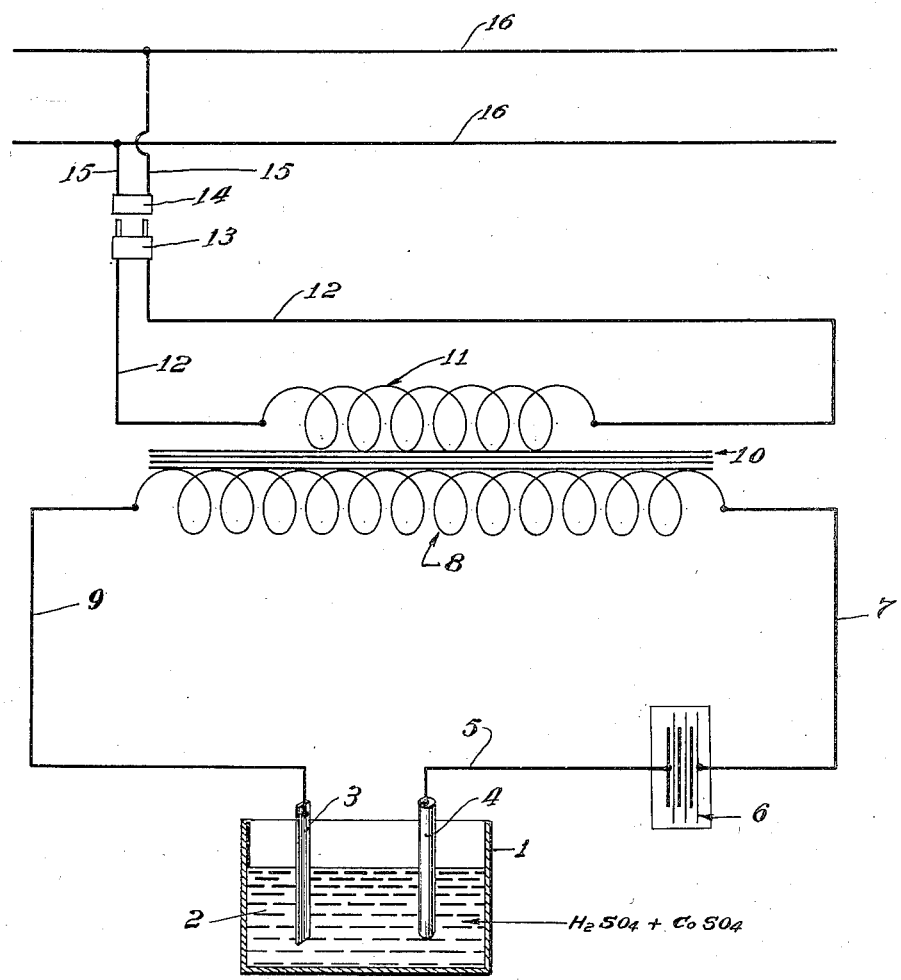
Inventor:
Edgar W. Engle
By: Williams, Bradbury
McCaleb & Hinkle
Atty's Patented Aug. 7, 1928.

1,680,210

UNITED STATES PATENT OFFICE.

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK.

RECTIFIER ELECTROLYTE.

Application filed January 7, 1927. Serial No. 159,523.

My invention relates to improvements in electrolytes and is applicable especially to the continuous, silent and permanent type of electrolytic battery chargers such as are commonly known as "trickle chargers", or the type illustrated and described in my former Patent No. 1,495,582, issued May 27, 1924, and reissued as No. 16,438 on October 12, 1926.

Heretofore battery chargers of this nature have been provided with electrolytes such as sulphuric acid or sulphuric acid to which has been added a small amount of ferrous sulphate. It has been found that when such electrolytes are used, the lead electrode gradually corrodes, decomposes, and disintegrates, yielding a discolored, turbid solution with a heavy sediment or precipitate settling out.

Although this action does not appreciably impair the rectifying qualities of the cell, the lead electrode is gradually consumed, yielding a sediment in the electrolyte which is objectionable.

I have discovered that the use of a small amount of cobalt in dilute sulphuric acid gives an electrolyte which, after continued use, does not form the objectionable sediment, and which preserves the lead electrode and prevents its corrosion.

The object of this invention is therefore to prevent the formation of sediment in electrolytic apparatus and to preserve the life of the electrode by the use of an improved electrolyte.

A further object is to provide an improved battery charger.

Other objects and advantages will appear from time to time as the description of the invention progresses.

A preferred embodiment of the invention is illustrated diagrammatically in the accompanying drawing.

A receptacle 1 of any suitable acid-proof material contains an electrolyte 2, preferably dilute sulphuric acid (specific gravity 1.25), to which has been added a small amount of cobalt. In the preferred embodiment five grams of cobalt sulphate are dissolved in 150 c. c. of dilute sulphuric acid (specific gravity 1.25). However, any suitable cobalt salt may be used and the cobalt may be introduced in the metallic form if desired. It is understood that various concentrations and proportions may be used without departing from the spirit of the invention.

Immersed in the electrolyte are two electrodes, a film-forming electrode 3, preferably of tantalum, and a non-film-forming electrode 4, preferably of lead. The tantalum electrode is preferably a ribbon about $\frac{3}{32}$ of an inch wide and which is immersed about two inches. The lead electrode is preferably a cylindrical cast block about $\frac{3}{4}$ inch diameter and two inches in length. Other rectifier electrodes and other shapes and sizes may be used without departing from the invention.

The lead electrode 4 is connected by a wire 5 to the negative terminal of a storage battery or accumulator 6 to be charged. The positive pole of the storage battery is connected by a wire 7 to the secondary coil 8 of a transformer, the other terminal of which is connected by a wire 9 to the tantalum electrode 3. The secondary coil 8 is wound around a core 10 on which is also wound primary coil 11 which is in turn connected by wires 12 to a suitable plug 13 adapted to fit in the conventional socket 14, which is connected by wires 15 to the ordinary alternating current lighting circuit 16. The transformer ratio is such as to cause current to flow in the secondary circuit at a pressure sufficient to charge the storage cells at the desired rate, which may vary in different cases.

It is understood, of course, that the above embodiment is given by way of example only and I do not limit myself to the specific modification shown. The rectifier cells may be made in other proportions or may be connected in series for various types of work. In any case no appreciable deposit or sediment will settle out, and the lead electrode will not be appreciably acted upon. At the same time the conductivity and film-forming properties of the electrolyte are not impaired but are actually improved.

I claim:

1. An electrolytic rectifier including a tantalum electrode, a lead electrode and a dilute sulphuric acid electrolyte to which has been added a small amount of cobalt sulphate.

2. A battery charger comprising an acid-proof container, an electrolyte of dilute sulphuric acid to which has been added a small quantity of cobalt sulphate, tantalum and lead electrodes immersed in said electrolyte, and connections to a source of alternating current and to storage cells to be charged.

3. In electrolytic apparatus including a lead electrode in sulphuric acid, means for preventing the decomposition of the lead including a small amount of a cobalt salt dissolved in said electrolyte.

4. An electrolyte for electrolytic rectifiers, condensers, and other electrolytic devices using lead electrodes, including sulphuric acid with less than 3% of cobalt sulphate dissolved therein.

5. An electrolyte comprising dilute sulphuric acid, a small amount of an iron salt dissolved therein to cut down its electrical resistance when used with an electrolytic cell and a small amount of a cobalt salt dissolved therein to prevent corrosion of lead electrodes.

In witness whereof, I here unto subscribe my name this 5th day of January, 1927.

EDGAR W. ENGLE.